US011349609B2

(12) United States Patent
Bhattad et al.

(10) Patent No.: US 11,349,609 B2
(45) Date of Patent: May 31, 2022

(54) HYBRID AUTOMATIC REPEAT REQUEST ACKNOWLEDGEMENT FEEDBACK ENHANCEMENT FOR NEW RADIO-UNLICENSED

(71) Applicant: QUALCOMM Incorporated, San Diego, CA (US)

(72) Inventors: Kapil Bhattad, Bangalore (IN); Jing Sun, San Diego, CA (US); Tanumay Datta, Bangalore (IN); Ananta Narayanan Thyagarajan, Bangalore (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 16/670,256

(22) Filed: Oct. 31, 2019

(65) Prior Publication Data

US 2020/0145138 A1 May 7, 2020

(30) Foreign Application Priority Data

Nov. 5, 2018 (IN) .............................. 201841041845

(51) Int. Cl.
*H04L 1/16* (2006.01)
*H04W 72/04* (2009.01)
*H04L 1/18* (2006.01)

(52) U.S. Cl.
CPC .......... *H04L 1/1671* (2013.01); *H04L 1/1614* (2013.01); *H04L 1/1812* (2013.01); *H04W 72/042* (2013.01)

(58) Field of Classification Search
CPC ... H04L 1/1671; H04L 1/1614; H04L 1/1812; H04L 1/1864; H04L 1/1858; H04L 1/1861; H04W 72/042; H04W 72/0446; H04W 16/14; H04W 84/042; H04W 74/08; H04W 72/02
See application file for complete search history.

(56) References Cited

U.S. PATENT DOCUMENTS 9,749,992 B2 * 8/2017 Zhang .................. H04L 5/0055
10,098,099 B2 * 10/2018 Chen .................... H04W 72/042
(Continued)

FOREIGN PATENT DOCUMENTS

WO   WO-2014036168 A1   3/2014
WO   WO-2016162791 A1   10/2016

OTHER PUBLICATIONS

International Search Report and Written Opinion—PCT/US2019/059514—ISA/EPO—dated Feb. 13, 2020 (190184WO).

*Primary Examiner* — Hanh N Nguyen
(74) *Attorney, Agent, or Firm* — Liem T. Do

(57) ABSTRACT

Hybrid automatic repeat request (HARQ) acknowledgement (ACK) feedback enhancements are disclosed for new radio (NR) unlicensed (NR-U). In the downlink control channel, two sets of identifiers (IDs) may be explicitly or implicitly signaled. The two IDs identify a current set ID and an additional set ID. Where the two IDs match, then the ACK feedback transmitted in the current ACK message will reflect the current transmissions. Otherwise, where the two IDs are different, the additional set ID identifies any previous or different ACK information that should be transmitted for prior transmissions.

29 Claims, 10 Drawing Sheets

(56) References Cited

U.S. PATENT DOCUMENTS

| | | | |
|---|---|---|---|
| 2011/0176443 A1* | 7/2011 | Astely | H04L 1/1861 |
| | | | 370/252 |
| 2014/0086216 A1 | 3/2014 | Yang et al. | |
| 2015/0092624 A1* | 4/2015 | Yao | H04L 5/1461 |
| | | | 370/278 |
| 2016/0119920 A1* | 4/2016 | Mallik | H04W 72/14 |
| | | | 370/336 |
| 2018/0123743 A1* | 5/2018 | Huang | H04L 1/1861 |
| 2018/0367283 A1* | 12/2018 | Huang | H04L 5/0094 |
| 2019/0124654 A1* | 4/2019 | Cherian | H04W 72/1226 |
| 2020/0358487 A1* | 11/2020 | Yang | H04L 5/0055 |

\* cited by examiner

HYBRID AUTOMATIC REPEAT REQUEST ACKNOWLEDGEMENT FEEDBACK ENHANCEMENT FOR NEW RADIO-UNLICENSED

CROSS-REFERENCE TO RELATED APPLICATIONS

This application claims the benefit of Indian Application No. 201841041845, entitled, "HARQ ACK FEEDBACK ENHANCEMENTS FOR NR-U," filed on Nov. 5, 2018, which is expressly incorporated by reference herein in its entirety.

BACKGROUND

Field

Aspects of the present disclosure relate generally to wireless communication systems, and more particularly, to hybrid automatic repeat request (HARQ) acknowledgement (ACK) feedback enhancements for new radio (NR) unlicensed (NR-U).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3G-PP). Examples of multiple-access network formats include Code Division Multiple Access (CDMA) networks, Time Division Multiple Access (TDMA) networks, Frequency Division. Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RE) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, at a user equipment (UE), a downlink control message from a serving base station, wherein the downlink control message includes an additional set identifier (ID) identifying one or more additional sets of downlink transmissions that map to one or more additional sets of acknowledgement resources, obtaining, by the UE, identification of a current set ID identifying a first set of downlink transmissions that map to a current set of acknowledgement resources, and transmitting, by the UE, an acknowledgement feedback message to the serving base station, wherein an acknowledgement status for each transmission identified by the current set ID and the additional set ID is encoded into the acknowledgement feedback message.

In an additional aspect of the disclosure, a method of wireless communication includes transmitting, by a base station, a downlink control message to a U), wherein the downlink control message includes an additional set ID identifying one or more additional sets of downlink transmissions that map to one or more additional sets of acknowledgement resources, and receiving, by the base station, an acknowledgement feedback message from the UE, wherein an acknowledgement status for each transmission identified by the additional set ID and a current set ID identifying a first set of downlink transmissions that map to a current set of acknowledgement resources is encoded into the acknowledgement feedback message.

In an additional aspect of the disclosure, an apparatus configured for wireless communication includes means for receiving, at a UE, a downlink control message from a serving base station, wherein the downlink control message includes an additional set ID identifying one or more additional sets of downlink transmissions that map to one or more additional sets of acknowledgement resources, means for obtaining, by the UE, identification of a current set ID identifying a first set of downlink transmissions that map to a current set of acknowledgement resources, and means for transmitting, by the UE, an acknowledgement feedback message to the serving base station, wherein an acknowledgement status for each transmission identified by the current set ID and the additional set ID is encoded into the acknowledgement feedback message.

In an additional aspect of the disclosure, an apparatus configured for wireless communication includes means for transmitting, by a base station, a downlink control message to a U), wherein the downlink control message includes an additional set ID identifying one or more additional sets of downlink transmissions that map to one or more additional sets of acknowledgement resources, and means for receiving, by the base station, an acknowledgement feedback message from the UE, wherein an acknowledgement status for each transmission identified by the additional set ID and a current set ID identifying a first set of downlink transmissions that map to a current set of acknowledgement resources is encoded into the acknowledgement feedback message.

In an additional aspect of the disclosure, a non-transitory computer-readable medium having program code recorded thereon. The program code further includes code to receive, at a UE, a downlink control message from a serving base station, wherein the downlink control message includes an additional set ID identifying one or more additional sets of downlink transmissions that map to one or more additional sets of acknowledgement resources, code to obtain, by the UE, identification of a current set ID identifying a first set of downlink transmissions that map to a current set of acknowledgement resources, and code to transmit, by the UE, an acknowledgement feedback message to the serving base station, wherein an acknowledgement status for each transmission identified by the current set ID and the additional set ID is encoded into the acknowledgement feedback message.

In an additional aspect of the disclosure, a non-transitory computer-readable medium having program code recorded thereon. The program code further includes code to transmit, by a base station, a downlink control message to a U), wherein the downlink control message includes an additional set ID identifying one or more additional sets of downlink transmissions that map to one or more additional sets of acknowledgement resources, and code to receive, by the base station, an acknowledgement feedback message from the UE, wherein an acknowledgement status for each transmission identified by the additional set ID and a current set ID identifying a first set of downlink transmissions that map to a current set of acknowledgement resources is encoded into the acknowledgement feedback message.

In an additional aspect of the disclosure, an apparatus configured for wireless communication is disclosed. The apparatus includes at least one processor, and a memory coupled to the processor. The processor is configured to receive, at a UE, a downlink control message from a serving base station, wherein the downlink control message includes an additional set ID identifying one or more additional sets of downlink transmissions that map to one or more additional sets of acknowledgement resources, to obtain, by the UE, identification of a current set ID identifying a first set of downlink transmissions that map to a current set of acknowledgement resources, and to transmit, by the UE, an acknowledgement feedback message to the serving base station, wherein an acknowledgement status for each transmission identified by the current set ID and the additional set ID is encoded into the acknowledgement feedback message.

In an additional aspect of the disclosure, an apparatus configured for wireless communication is disclosed. The apparatus includes at least one processor, and a memory coupled to the processor. The processor is configured to transmit, by a base station, a downlink control message to a U), wherein the downlink control message includes an additional set ID identifying one or more additional sets of downlink transmissions that map to one or more additional sets of acknowledgement resources, and to receive, by the base station, an acknowledgement feedback message from the UE, wherein an acknowledgement status for each transmission identified by the additional set ID and a current set ID identifying a first set of downlink transmissions that map to a current set of acknowledgement resources is encoded into the acknowledgement feedback message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
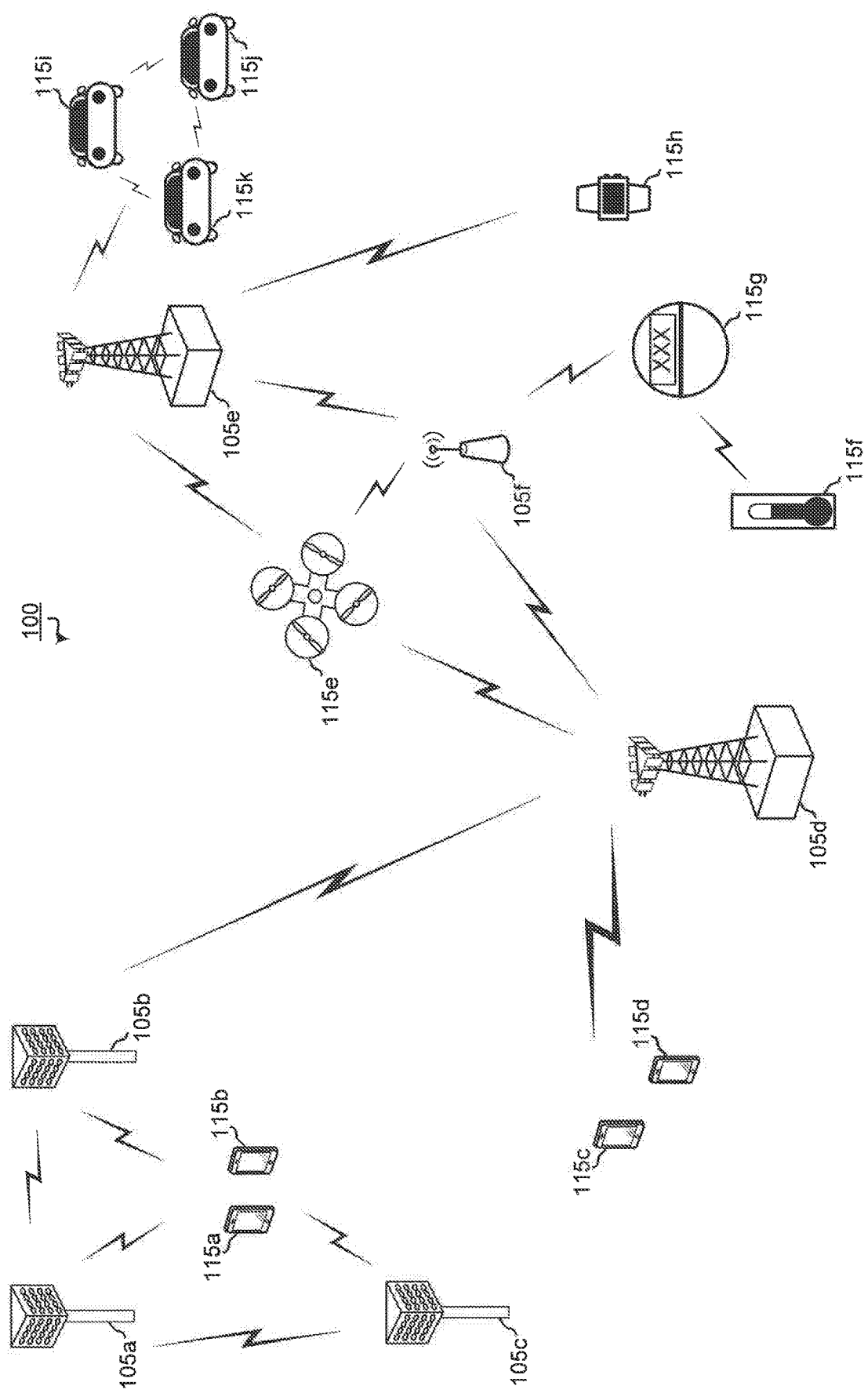
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OMM and the like. UTRA, E-UTRA, and Global System for Mobile Communications (GSM) are part of universal mobile telecommunication system (UMTS). In particular, long term evolution (LTE) is a release of UMTS that uses E-UTRA, UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GFP long term evolution (LTE) is a 3GPF project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99,9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (COMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UP 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
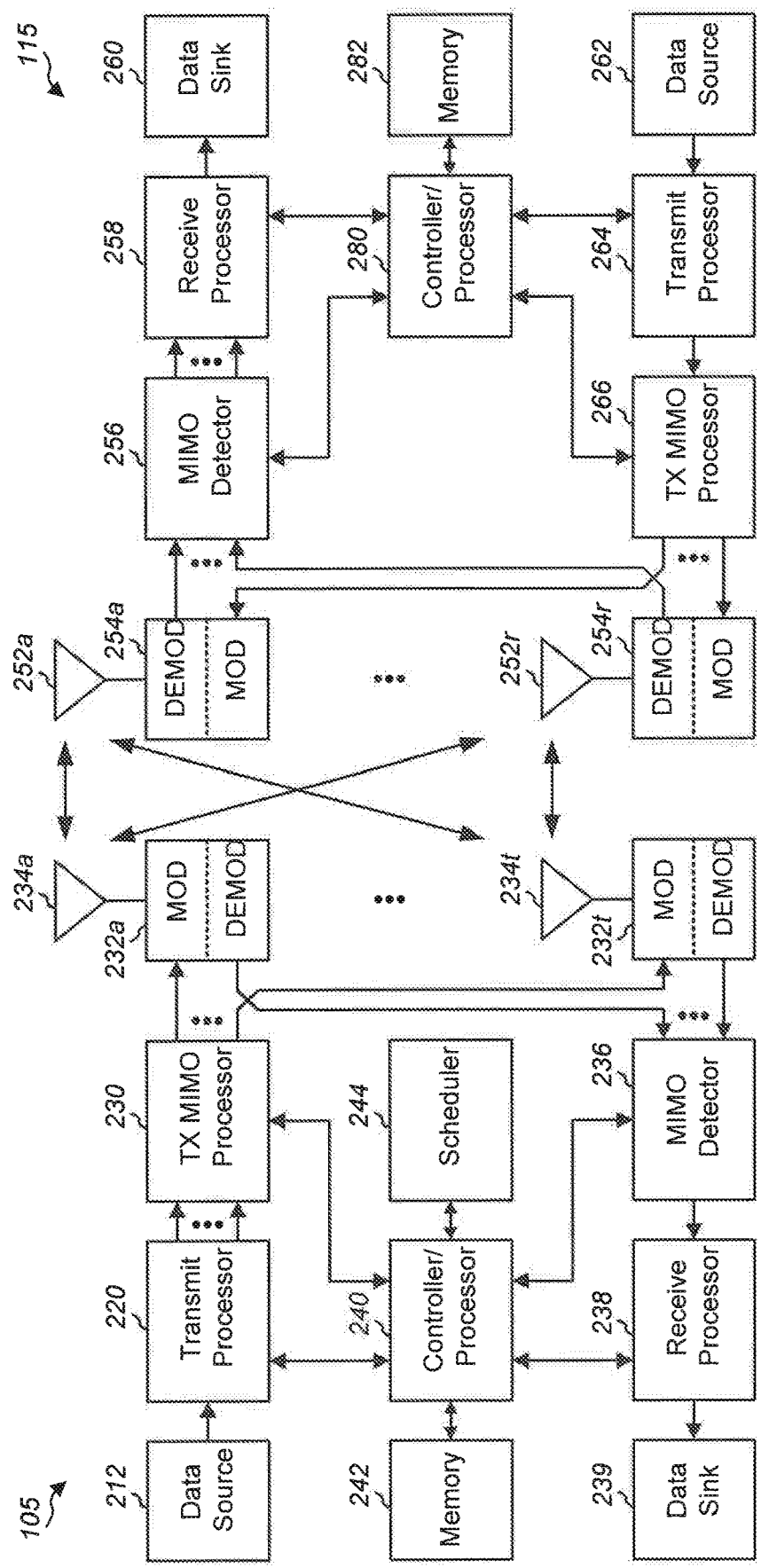
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODS) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4A and 4B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
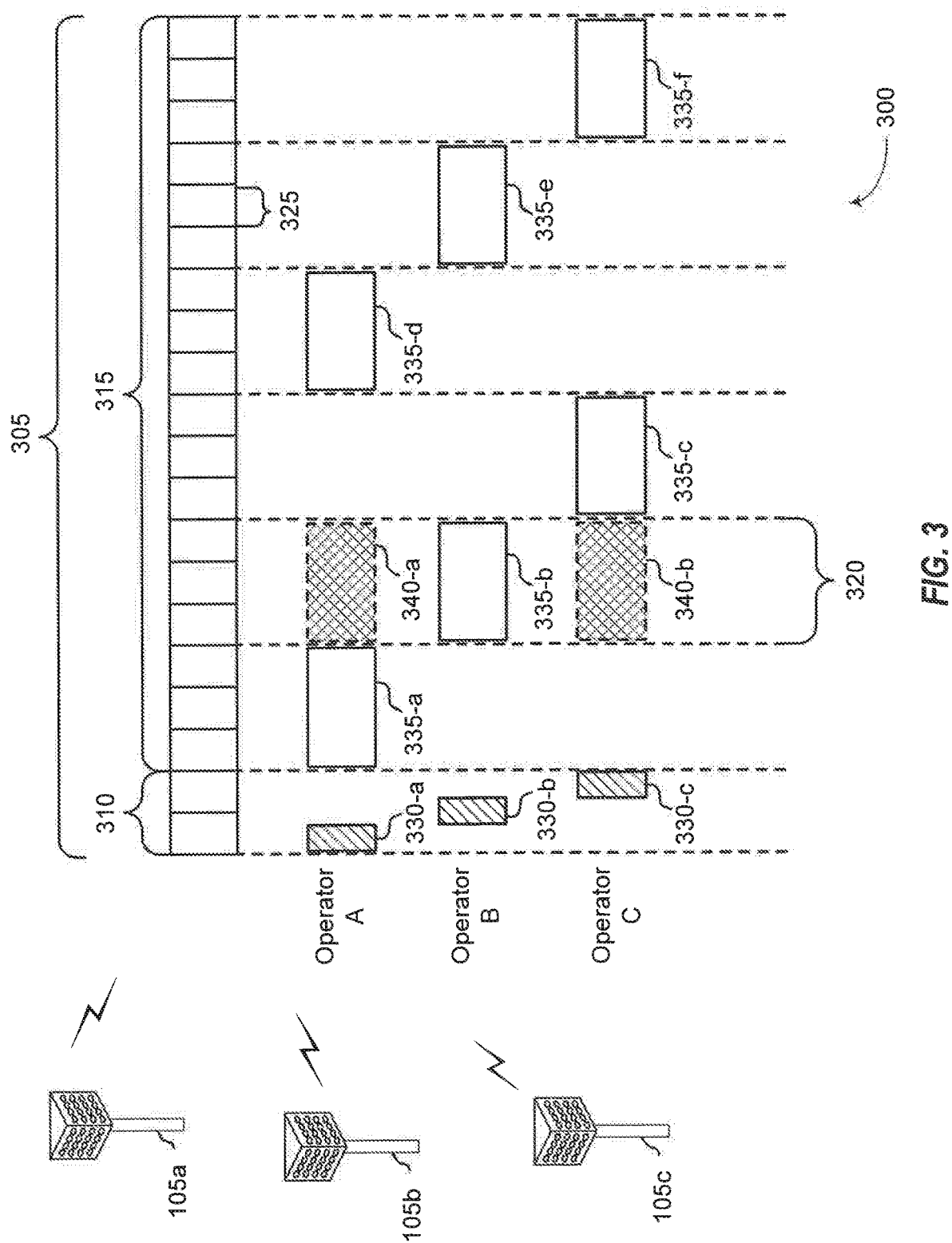
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms), While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a C-NT for Operator A (e.g., G-INT-OpA). Similarly, resources 335-b may be prioritized for Operator B (e.g., G-INT-OpB), resources 335-c may be prioritized for Operator C (e.g., G-INT-OpC), resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth, Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT, For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-NT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-NT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-NT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a CANT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

NR access technologies provide for a downlink control message, such as a downlink control information (DCI) that includes a signal-to-acknowledgement (ACK) delay indicator field which determines where an acknowledgement (e.g., ACK/NACK) may be sent for a received transmission (e.g., PDCCH, PDSCH, etc.). Transmissions that map to the same acknowledgement resource will be sent together. NR technologies currently support two modes for codebook size determination for HARQ feedback: semi-static and dynamic modes. In the semi-static mode, the UE assumes that all transmission time intervals (TTIs) that could have acknowledgement information on that particular acknowledgement resource may be present for computation of the acknowledgement codebook size. This procedure may result in high overhead but is robust enough to account for missed transmissions. For downlink control transmissions that were not detected, the UE would send a negative acknowledgement (NACK).

It should be noted that downlink transmissions (e.g., PDCCH, PDSCH) that map to a second acknowledgement resource but that are within the semi-static acknowledgement codebook size determination window of a first acknowledgement resource will not be sent on the first acknowledgement resources.

In the dynamic mode, the UE assumes that only the detected control transmissions will be available for codebook size computation. Downlink control messaging in the dynamic mode includes downlink assignment indices (DAIs) identifying a total number of downlink transmissions (tDAI) for acknowledgement and a counter identifying which number of that total the current transmission slot is (cDAI). The use of both tDAI and cDAI creates a robust correction mechanism for identifying or reducing the occasions of false PDCCH detects or missed PDCCH detects. Acknowledgement feedback signals may not be received by the serving base station, whether they were never sent by the UE because of listen before talk (LBT) failure or, if sent, never successfully received and decoded by the base station. Various aspects of the present disclosure provide a mechanism to retransmit failed acknowledgement feedback or transmit it along with the acknowledgement feedback of future downlink transmissions.

Figure 4:
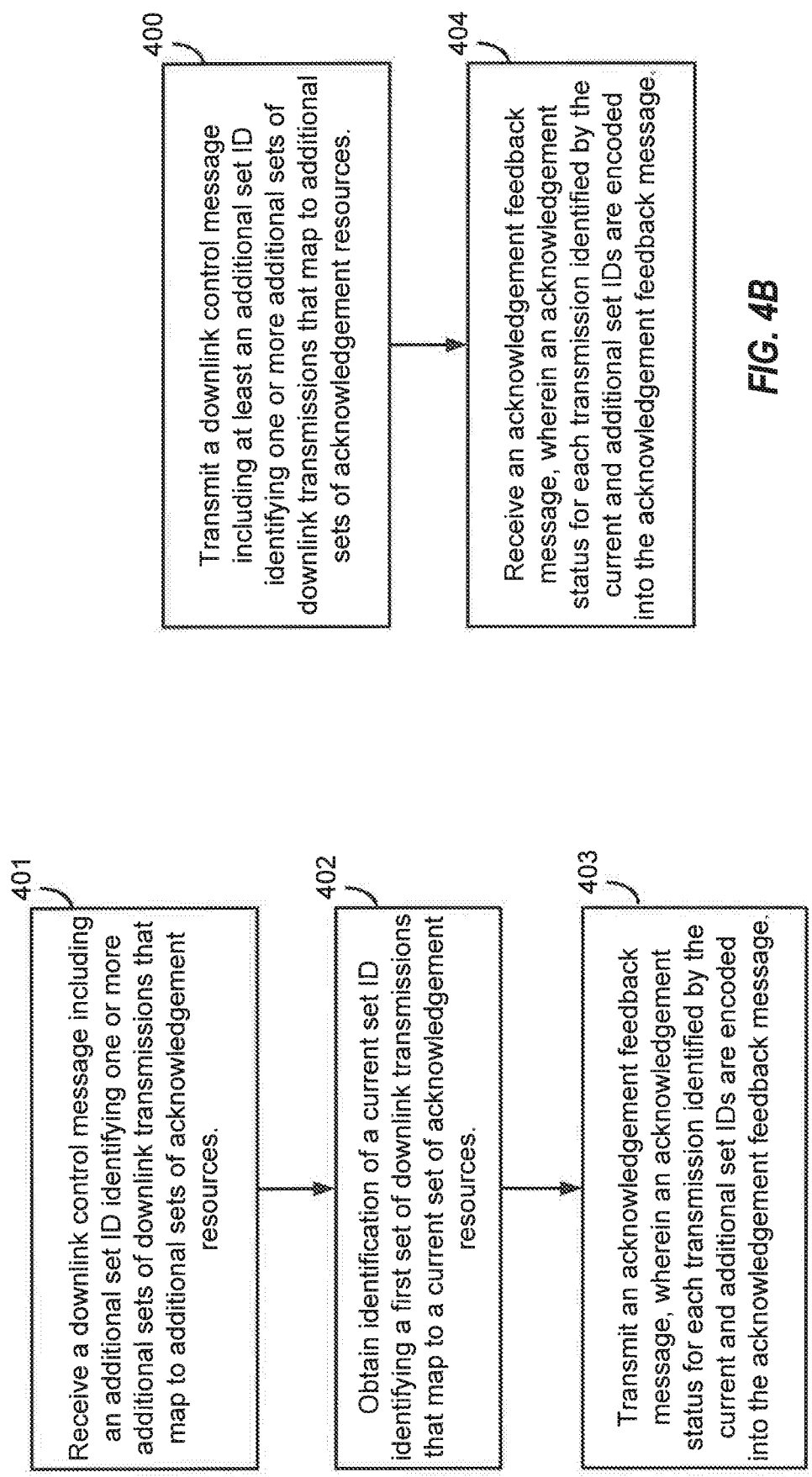
FIGS. 4A and 4B are block diagrams illustrating example blocks executed by a base station and a UE to implement aspects of the present disclosure.
Figure 9:
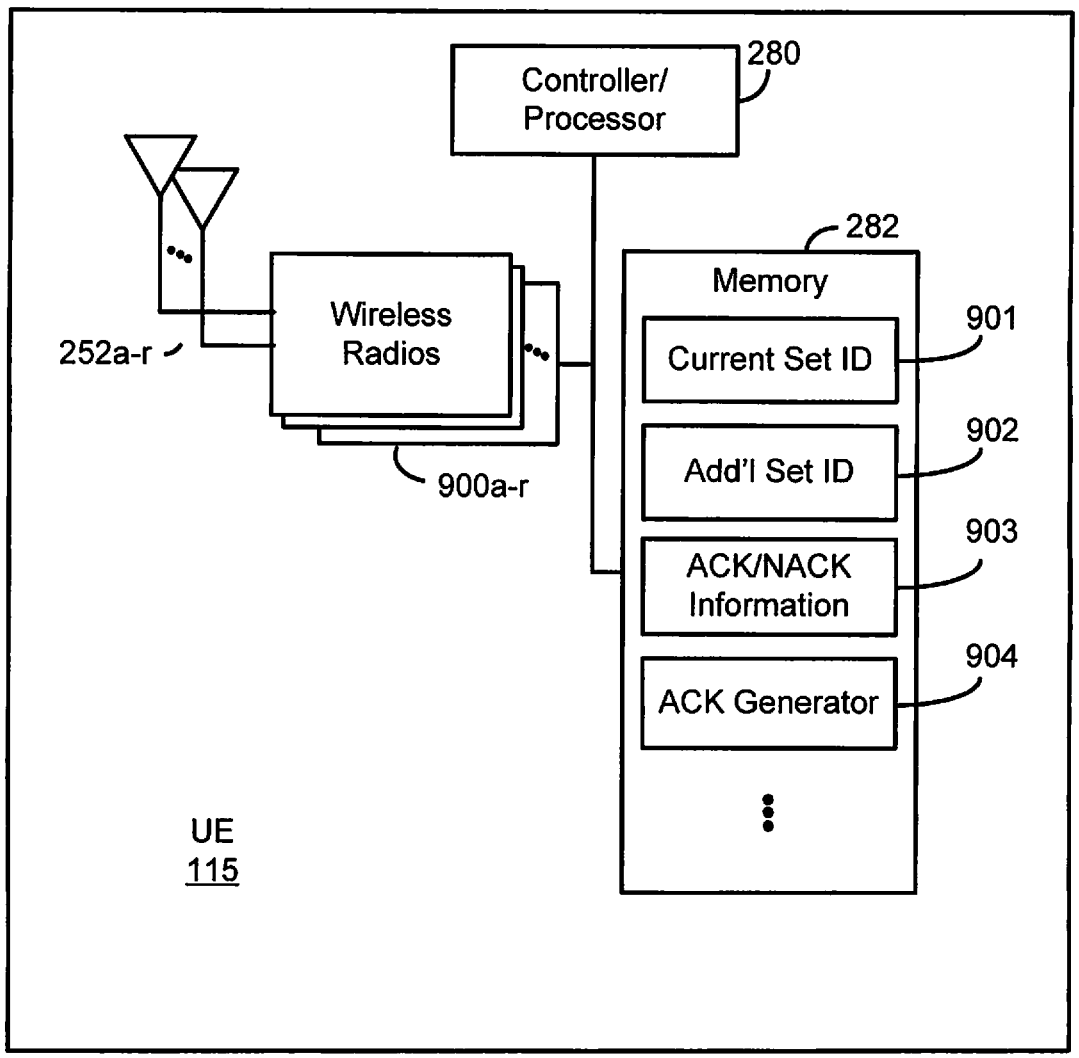
FIG. 9 is a block diagram illustrating an example UE configured according to aspects of the present disclosure.

FIGS. 4A and 4B are block diagrams illustrating example blocks executed by a base station and a UE to implement aspects of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UP 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for UE 115, including modulator/ demodulators 254*a-r*, MIMO detector 256, receive processor 258, transmit processor 264, and TX MIMO processor 266.

Figure 10:
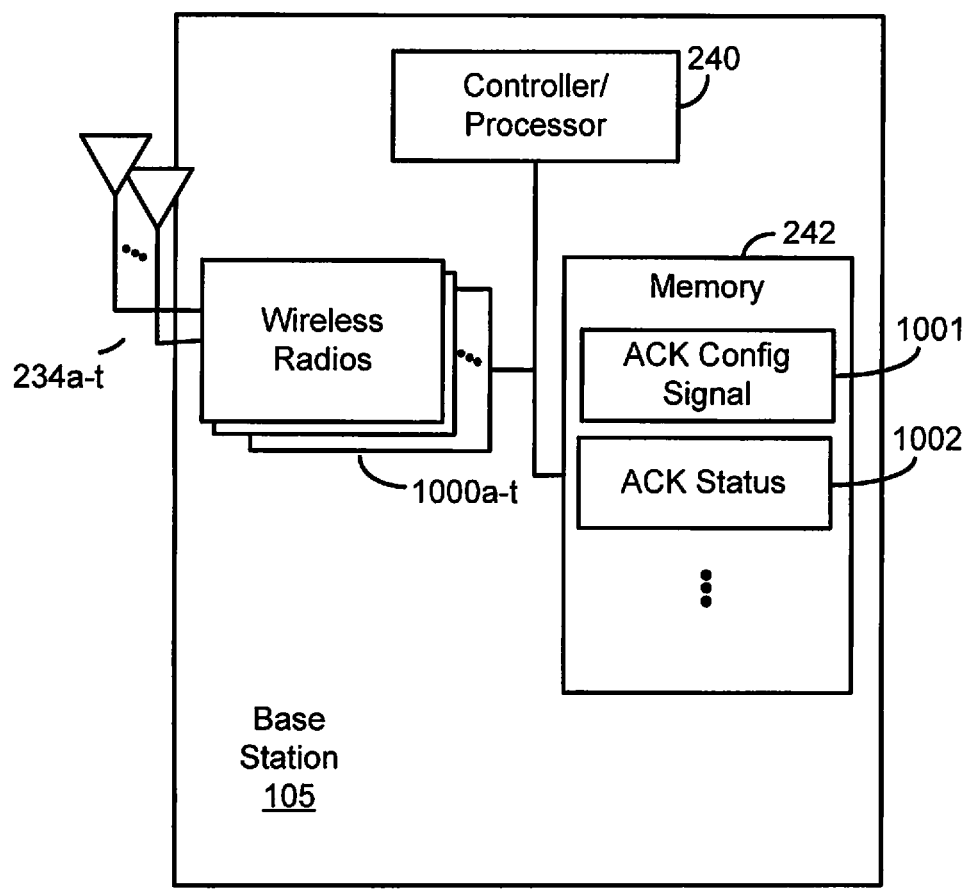
FIG. 10 is a block diagram illustrating an example base station configured according to aspects of the present disclosure.

The example blocks will also be described with respect to base station 105 as illustrated in FIG. 10. FIG. 10 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1000*a-t* and antennas 234*a-t*. Wireless radios 1000*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 400, a base station transmits a downlink control message to a UE, wherein the downlink control message includes an additional set ID identifying one or more additional sets of downlink transmissions that map to one or more additional sets of acknowledgement resources. For example, a base station, such as base station 105, under control of controller/processor 240, executes acknowledgement configuration logic 1001, stored in memory 242. The execution environment of acknowledgement configuration logic 1001 provides the functionality, based on the acknowledgement status of various sets of transmissions stored at acknowledgement status 1001, in memory 242, determines an set of prior transmissions that have either not been acknowledged or that have been negatively acknowledged (NACK) and sets an additional set ID in the downlink control message. Base station 105 would transmit this downlink control message to a served UE via wireless radios 1000*a-t* and antennas 234*a-t*.

At block 401, a UE receives the downlink control message from the serving base station, wherein the downlink control message includes at least the additional set ID identifying one or more additional sets of downlink transmissions that map to the additional sets of acknowledgement resources. A UE, such as UE 115, receives the downlink control message via antennas 252*a-r* and wireless radios 900*a-r*. UE 115 decodes the additional set ID from the message and stores at additional set ID 902, in memory 282. The additional set ID may identify a single set of transmission or multiple sets of transmissions. When there are a number of possible sets of transmissions that may be identified as an additional set, the additional set ID may include a bitmap, in Which the of length of the bitmap=the number of sets−1. Activated sets of transmissions may be indicated in the bitmap for the UE to determine which corresponding acknowledgement status information to include in the acknowledgement feedback.

At block 402, the UE obtains identification of a current set ID identifying a first set of downlink transmissions that map to a current set of acknowledgement resources. UE 115 may obtain the current set ID either directly from the base station, by including the current set ID in the downlink control message with the additional set ID received via antennas 252*a-r* and wireless radios 900*a-r*. Whether received direction from the base station or derived based on available information, UE 115 would store the current set ID in memory 282 at current set ID 901. The current set ID indicates the set ID for the current set of downlink transmissions (e.g., PDCCH, PDSCH) that map to the same acknowledgement resource, while the additional set ID indicates a previous set ID whose corresponding acknowledgement information is to be include along with the acknowledgement information for the current set ID.

UE 115 may implicitly obtain the current set ID by deriving the set ID based on parameters, such as slot index of the acknowledgement transmission time and acknowledgement resource indicator (ARI). Moreover, the base station may configure the number set IDs via RRC signaling, while the set ID can be the parameters above the modulo of the number of set IDs. In certain aspects, the slot index or time may be used to introduce variation of set ID, and the ARI can be used to allow a level of base station control in case there is group index collision, such as where the set IDs begins to repeat. For example, if the set ID is determined by the equation:

$$\text{set ID} = \text{slot ID} \bmod \text{number of set IDs} \quad (1)$$

Where the acknowledgement feedback message is scheduled to be sent on slot number X and there are X+ number of sets, then they will have the same set ID, which may not be what the base station intended if it did not successfully receive the first acknowledgement message. Use of the ARI allows flexibility for the base station by setting the function for determining set ID to the equation:

$$\text{set ID} = (\text{slot ID} + \text{ARI}) \bmod \text{number of set IDs} \quad (2)$$

The base station may then change the ARI to also have control over determination of the set ID. Additional aspects of the present disclosure may provide for the set ID to be derived partly implicitly and partly through explicit indication in a downlink control DCI.

At block 403, the UE transmits an acknowledgement feedback message to the serving base station, Wherein an acknowledgement status for each transmission identified by the current set ID and the additional set ID is encoded into the acknowledgement feedback message. If current set ID 901 is the same as additional set ID 902, then no previous acknowledgement information would be included in the feedback message. Only where the current and additional set IDs are different would UE 115 be triggered to retransmit or send the additional acknowledgement information, stored in memory 282, at acknowledgement information 903, associated with the previous sets of transmissions identified. In additional aspects, where the additional set ID is indicated via a bitmap, as noted above, UE 115 can directly concatenate the acknowledgement status bits sequentially according to the bitmap/indication of additional set ID(s), which may either follow or precede the current acknowledgement feedback.

At block 404, the base station receives the acknowledgement feedback message from the UE, wherein an acknowledgement status for each transmission identified by the current and additional set IDs are encoded into the acknowledgement feedback message. Base station 105 would receive the acknowledgement feedback transmitted by the served UE via antennas 234*a-t* and wireless radios 1000*a-t*.

Figure 5:
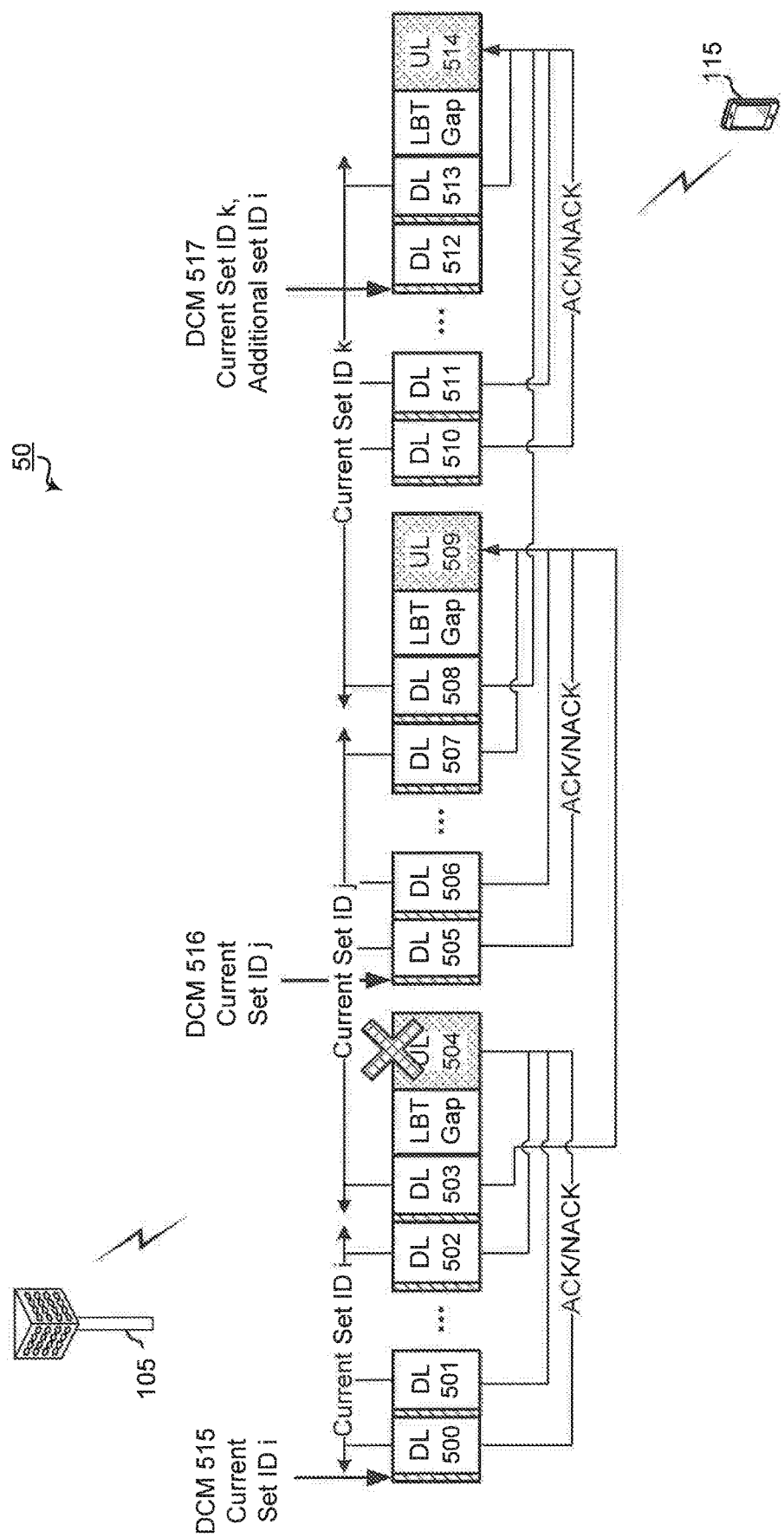
FIG. 5 is a block diagram illustrating an NR network with a base station and UE, each configured according to one aspect of the present disclosure.

FIG. 5 is a block diagram illustrating an NR network 50 with base station 105 and UE 115, each configured according to one aspect of the present disclosure. Base station 105 transmits a downlink control message 515 (e.g., DCI, PDCCH, etc.) to UE 115. Downlink control message 515 includes a current set ID i that identifies transmissions in downlink slots 500-502 for set ID i that map to the acknowledgement resources in uplink slot 504. UE 115 transmits acknowledgement status information for the downlink transmission at uplink slot 504, but base station 105 fails to successfully receive the acknowledgement feedback. Base station 105 then transmits downlink control message 516 that includes a current set ID j that identifies transmissions in downlink slots 503, 505-507 for set ID j that map to the acknowledgement resource in uplink slot 509. Base station 105 may arbitrarily assign various transmissions and acknowledgement resources to the set IDs, without regard to location or contiguity of the resources or slots.

UE 115 transmits acknowledgement feedback for the transmissions identified by current set ID j in uplink slot 509. At this point in the time line, base station 105 determines that it did not receive the acknowledgement feedback information for set ID i. Accordingly, base station 105 transmits downlink control message 517, which includes a current set ID k and an additional set IDI. Set ID k identifies the transmissions in downlink slots 508, 510-513 for feedback at the acknowledgement resources in uplink slot 514. The addition of additional set ID i within downlink control message 517 indicates to UE 115 that the acknowledgement information associated with the transmissions of set ID i should be added to the acknowledgement feedback for transmission in the same acknowledgement resources in uplink slot 514.

Figure 6:
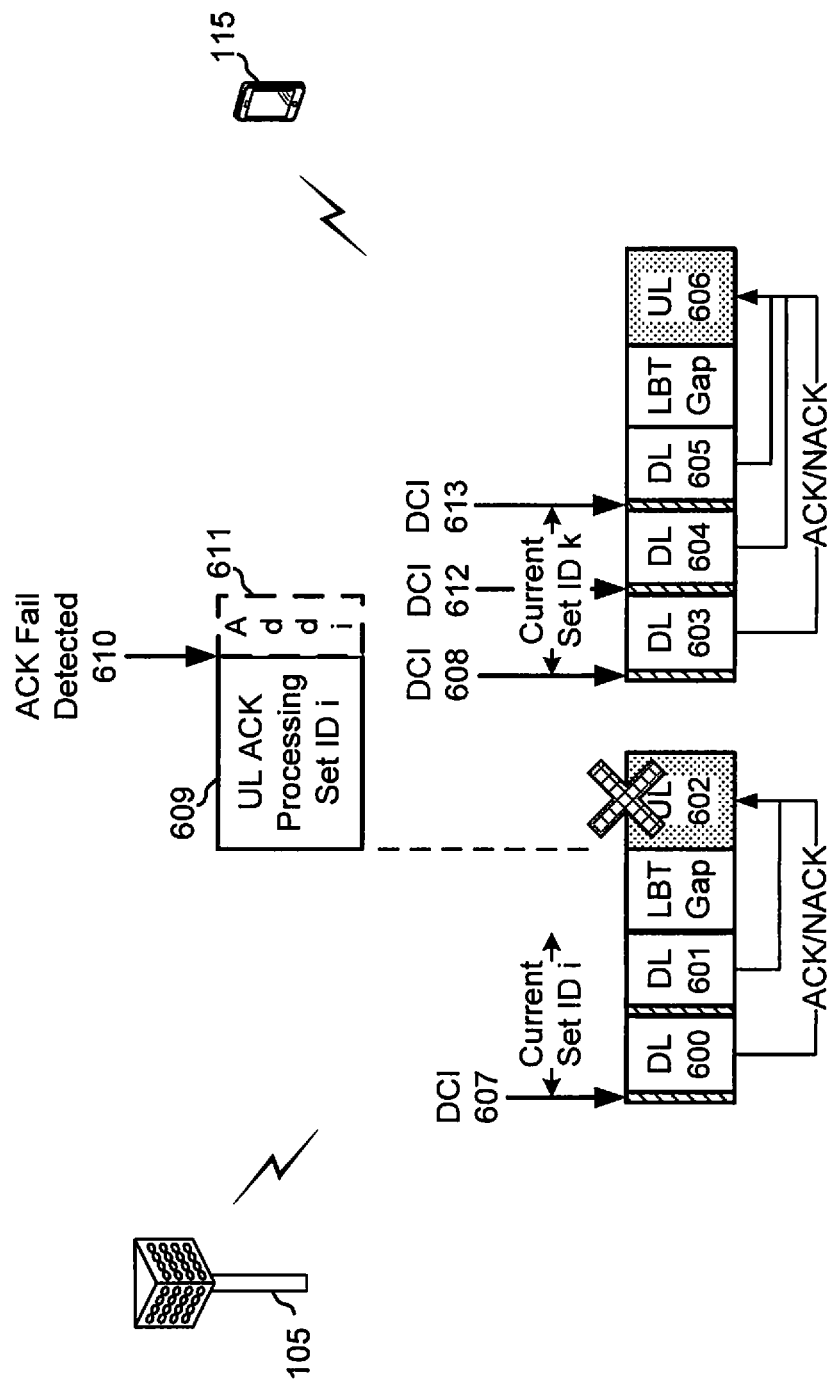
FIG. 6 is a block diagram illustrating an NR network with a base station and UE, each configured according to one aspect of the present disclosure.

FIG. 6 is a block diagram illustrating an NR network 60 with base station 105 and UE 115, each configured according to one aspect of the present disclosure. Within the multiple transmissions identified as included in the set IDs, there are multiple occasions where base station 105 may transmit a downlink control message, such as a DCI, with set ID information. Because there may be multiple DCIs corresponding to the same acknowledgement resources, there may be different optional means in various additional aspects of the present disclosure for determining how the additional set ID may be set across the different DCIs. As illustrated, base station 105 transmits a DCI 607 to UE 115 that identifies a current set ID i including transmissions in downlink slots 600 and 601 that map to the acknowledgement resources in uplink slot 602. UE 115 determines the acknowledgement status for each of the transmissions of current set ID i, but a failed LBT procedure prevents UE 115 from transmitting acknowledgement feedback message to base station 105 at uplink slot 602.

Base station 105 transmits DCI 608 to UE 115 which includes current set ID k that identifies the transmissions in downlink slots 603-604 that map to the same acknowledgement resources in uplink slot 606. While UE 115 failed to transmit the acknowledgement feedback for set ID i, uplink acknowledgement processing 609 by base station 105 does not end until after DCI 608 has already been sent. Base station 105 detects acknowledgement information failure at 610. The current set ID has to be the same across all DCIs of a particular set of transmissions. However, according to various alternative aspects of the present disclosure, base station 105 may handle the change in additional set ID status in different manners. In a first optional aspect, the same rule may apply to the additional set ID, such that, any additional set ID would have to be the same in each DCI transmitted over the group of related transmissions. Thus, according to this first optional aspect, while base station 105 detects that it has not received the acknowledgement information corresponding to set ID i, it may not send set ID i as an additional set ID for the remainder of the group of transmissions corresponding to current set ID k. DCI 612 transmitted by base station 105 according to this aspect would be limited to include only the current set ID k.

In a second optional aspect, a change in the additional set ID status may be made, but it may only be made once per set of transmissions identified by a set ID. Thus, according to the second optional aspect, after detecting failure to receive the acknowledgement information of set ID i at 610, base station 105 may indicate addition of the missing set ID i information at 611 and send DCI 612 to include the additional set ID i. Any remaining DCI, such as DCI 613, that would be available for the transmissions of set ID k would include the current set ID k and the additional set ID i, regardless of whether further changes or discover of acknowledgement failure of previous set IDs is made. This optional aspect provides additional flexibility to the base station timeline, as when the first DCI, DCI 608, for new set ID is transmitted, base station 105 may not have enough time to determine if it received previous acknowledgement feedback or not.

In a third optional aspect, one or more changes are allowed after the first DCI of the set ID, Thus, if base station 105 determines a further change in acknowledgment information status, it may provide a different additional set ID in a subsequent DCI, such as DCI 613. When different additional set IDs are included in multiple DCI within a set ID, various optional methods may be used for processing the information. In a first optional solution, UE 115 would only use the additional set ID value in the last received DCI, DCI 13, to determine the acknowledgement set. In a second optional solution, UE 115 may use all of the indicated additional set ID's identified in DCI 608, 612, and 613 for determining the acknowledgement information to include in the acknowledgement feedback message to base station 105.

Figure 7:
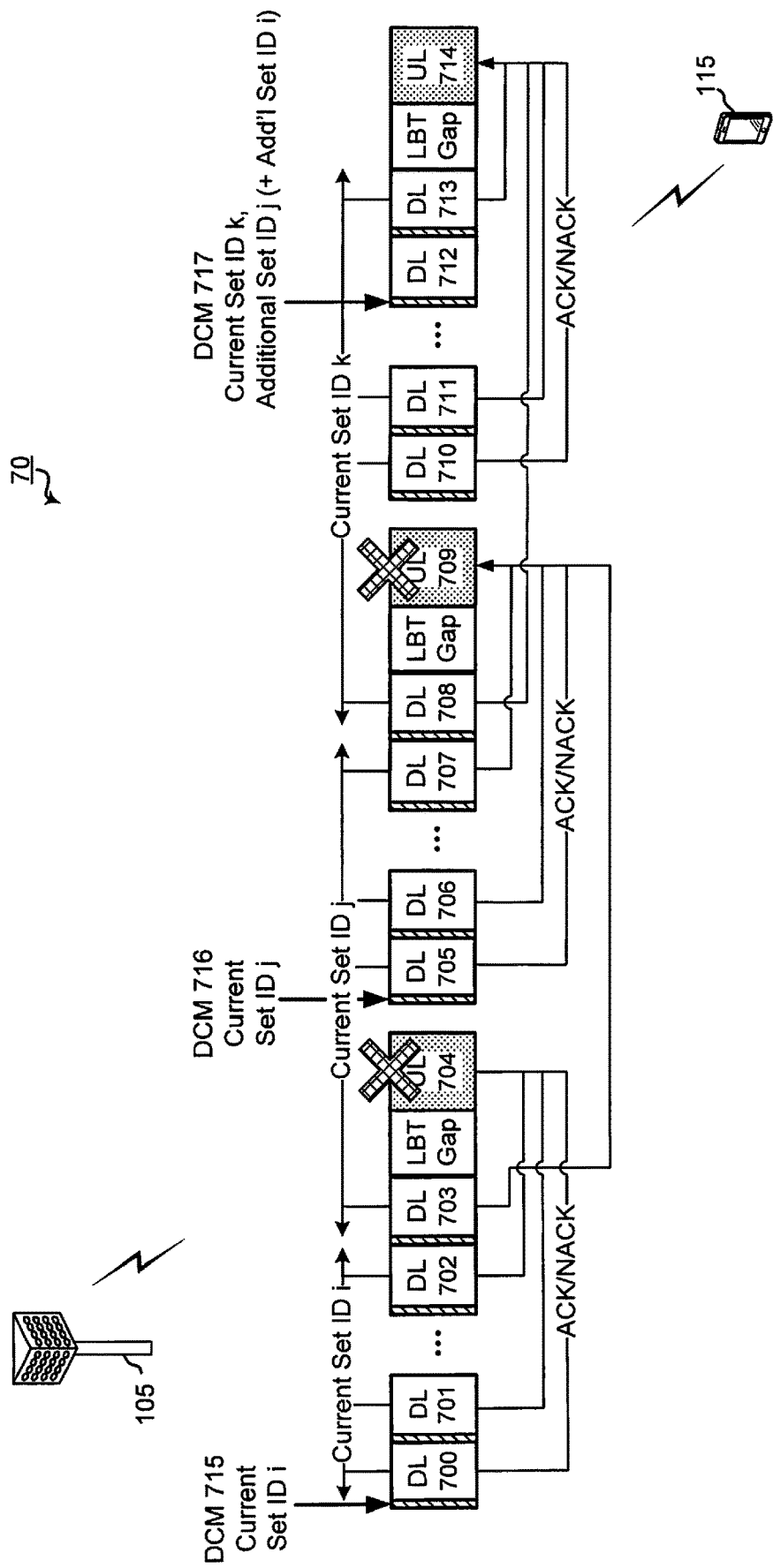
FIG. 7 is a block diagram illustrating an NR network with a base station and UE, each configured according to one aspect of the present disclosure.

FIG. 7 is a block diagram illustrating an NR network 70 with base station 105 and UE 115, each configured according to one aspect of the present disclosure. According to the scenario illustrated in FIG. 7, base station 105 transmits downlink control message 715 to UE 115 that includes the current set ID i identifying transmissions in downlink slots 700-702 that map to the acknowledgement resources in uplink slot 704. Base station 105 transmits downlink control message 716 to UE 115 that includes the current set ID j identifying transmissions in downlink slots 703, 705-707 that map to the acknowledgement resources in uplink slot 709. Because either UE 115 failed to transmit or base station 105 did not successfully receive, base station 105 identifies the failure of acknowledgement information for both set IDs i and j.

After determining the acknowledgement failure, base station 105 transmits downlink control message 717. Downlink control message 717 includes the current set ID k and an additional set ID j. Current set ID k identifies the transmissions at downlink slots 708, 710, 711, and 713 that map to the same acknowledgement resources in uplink slot 714. However, the additional set ID j includes a recursive identification of acknowledgement information for set ID i, as well, to be included in the acknowledgement feedback message in the acknowledgement resources of uplink slot 714. The addition of so many additional previous transmissions to include in acknowledgement feedback message may challenge the ability of UE 115 to correctly determine the codebook size for the acknowledgement codebook. Various optional aspects of the present disclosure may be used to deal with the additional acknowledgement information requested through the additional set ID.

In a first optional aspect, UE 115 prepare the acknowledgement feedback message including only the acknowledgement information associated with the transmissions identified by the current set ID and the top level of the additional set ID. The remaining set ID request would be ignored. Thus, for the acknowledgement message in uplink slot 714, UE 115 uses the acknowledgement status for current set ID k and additional set ID j to encode the acknowledgement feedback message in uplink slot 714. This optional aspect may be beneficial for use with a semi-static codebook size determination.

In a second optional aspect, UE 115 may prepare the acknowledgement feedback message for uplink slot 714 to include all the acknowledgement information recursively (e.g., current set k, additional set ID j, additional set ID i). In such aspects, the recursion may be limited to up to a predetermined number, N, of previous additional set IDs. Alternatively, the recursion may be limited to up to when the set IDs begin to repeat. Still further alternative options may limit the recursion up to when the additional set ID has not been set (e.g., the same as the current set ID in the downlink control message that original set the limited additional set IE).

As noted previously, NR technology includes a semi-static mode and a dynamic mode for determining an acknowledgement codebook size for acknowledgement signaling processes. According to the various aspects of the present disclosure, in a semi-static mode, the codebook size may either always be double of the case without the additional set ID being configured or it may be determined dynamically based on whether the additional set ID has been set to different value than current set ID or not. With reference back to FIG. 5, when the additional set ID is set, such as in downlink control message 517, UE 115 may either assume that the codebook size is double that of either the acknowledgements regarding set IDs i or j, as defined in downlink control messages 515 and 516. Alternatively, UE 115 dynamically determines the codebook size based on the additional set ID being present in downlink control message 517.

In a dynamic mode, UE 115 may determine the codebook size dynamically based on the additional set ID according to the DAI parameters transmitted by base station 105 in any downlink control messages. For example, in a first optional aspect, base station 105 may increment the DAIs for the downlink control messages in each set ID independently. Thus, at downlink control message 517, there are two different sets of DAIs, one set for set ID i and one set for set ID k. Base station 105 would increment these DAIs separately for set ID i and set ID k.

In an example second optional aspect, base station 105 may increment the DAI for DCIs for the current and additional set IDs in continuance, such that when the DAI for the current set ID k end, the next DAI for set ID i are incremented from where the last DAI of set ID k stops. In cases, as described above, where the additional set ID may be configured in a later downlink control message, after the first downlink control message of the current set ID, base station 105 may increment the DAI in the first DCI where it changes (e.g., DCI 612 (FIG. 6)) considering the last DAI of the previous set ID (e.g., set ID i (FIG. 6)) and DAI in the previous DCI (e.g., DCI 608 (FIG. 6)) of the current set ID (e.g., set ID k (FIG. 6)).

In dynamic codebook cases, if UE 115 misses the last few DCIs, the DAI information will still be as expected, but the acknowledgment codebook size will not match what base station 105 is expecting. In such scenarios, when the previous acknowledgement information transmission, such as for additional set ID i (FIG. 5), is transmitted with the new acknowledgement transmission, such as for current set ID k (FIG. 5), there will be a codebook size mismatch. In one optional aspect, base station 105 may configure the total number of bits to include for acknowledgement status information from previous transmissions independently of what is determined through detected downlink control messages (e.g., DCIs, etc.). For example, such total number of bits may be configured via RRC signaling, Where the additional set ID is represented as a bitmap, as noted previously, the total number of bits to include for the acknowledgement feedback message can be based on number of additional set IDs activated as determined by the bitmap. This could also be based partly on additional signaling in the current downlink control message (e.g., a DCI that indicate the number of bits that should have been included for previous acknowledgement feedback messages).

There may be occasions where a UE, such as UE 115, may miss all the downlink control signaling that corresponds to a particular set ID. When base station 105 identifies the transmission resources for the acknowledgement feedback for that set ID, UE 115 would end up sending the acknowledgement information for previous transmissions that have the same set ID, but that would cause mismatch. To avoid such mismatch issues, various aspects of the present disclosure provide for base station 105 to include a new group indicator (NGI) that may be toggled when a group of set IDs begins to repeat.

Figure 8:
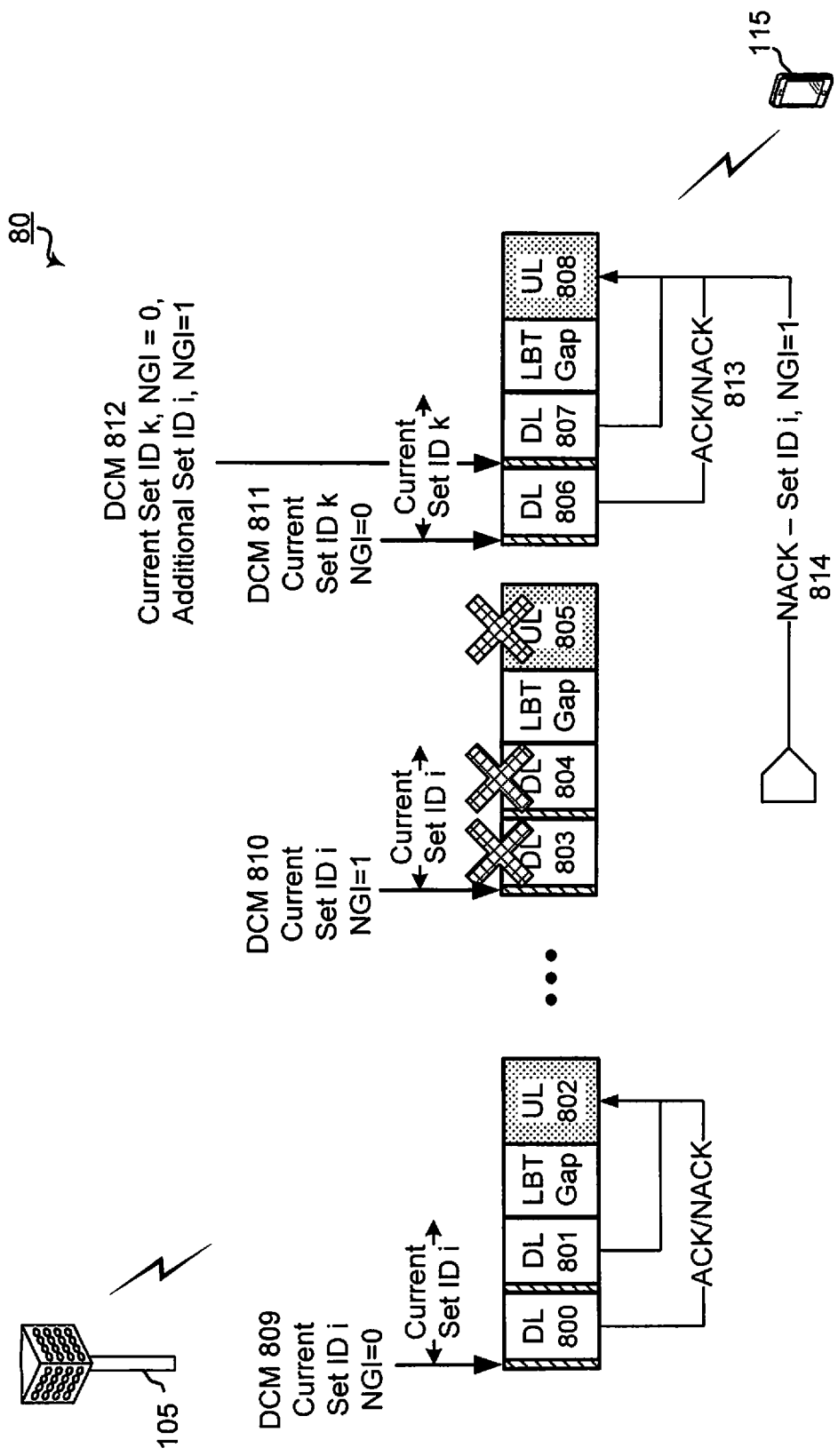
FIG. 8 is a block diagram illustrating an NR network with a base station and UE, each configured according to one aspect of the present disclosure.

FIG. 8 is a block diagram illustrating an NR network 80 with base station 105 and UE 115, each configured according to one aspect of the present disclosure. According to the example aspect illustrated in FIG. 8, base station 105 may transmit a downlink control message that includes two additional bits for the NGI: one bit for the NGI of the current set ID and one bit for the NGI of additional set ID. Base station 105 will toggle the NGI bit every time it uses the same set ID for downlink transmission whose corresponding acknowledgement information is sent on different acknowledgement resources. UE 115 will report the full acknowledgement feedback information for the additional set ID only if the NGI in the current downlink control message matches the last-received NGI for that set ID.

As illustrated in FIG. 8, base station 105 transmits downlink control message 809 that includes a current set ID i with an NGI set to 0 identifying transmissions in downlink slots 800 and 801 with set ID i. UE 115 successfully sends the acknowledgement information at uplink slot 802. At a later time, base station 105 transmits downlink control message 810 that includes a current ID set ID i with an NGI toggled to 1. As the set ID i is being repeated after acknowledgement information for a previous set ID of the same value, base station 105 has toggled the NGI bit. However, UE 115 completely misses all of the downlink transmissions at downlink slots 803 and 804 identified by set ID i, NGI=1, and, therefore, also does not send any acknowledgement information at uplink slot 805.

Base station 105 sends downlink control message 811 including only the current set ID k, with NGI of 0, identifying the transmissions in downlink slots 807 and 808 that map to the same acknowledgement resources in uplink slot 808. Base station 105 determines after sending downlink control message 810 that it did not receive the acknowledgement information for set ID i with NGI=1. Accordingly, in the next downlink control message, downlink control message 812, base station 105 adds additional set ID i with NGI=1. However, when UE 115 identifies the additional set ID i with NGI=1, it compares that against the last set ID i that it has record of. Because UE 115 failed to receive any of the transmissions in downlink slots 803 and 804, the last set ID i that UE 115 has in memory has an NGI=0. Because the NGI bits do not match, UE 115 identifies that it does not have the acknowledgement information requested by the additional set ID i with NGI=1.

In one optional aspect of the present disclosure, when UE 115 detects the mismatch in NGI bit, UE 115 report a NACK corresponding to the additional set ID i in uplink slot 808. This optional aspect may be limited when UE 115 operators with a dynamic codebook where UE 115 does not have up to date DAI information. However, this optional aspect may be handled without additional processing for semi-static codebook mode operation.

In a second optional aspect of the present disclosure, when UE 115 detects the mismatch in NGI bit, UE 115 will simply ignore the additional set ID i in determining the codebook size and acknowledgement feedback, and the like for uplink slot 808.

In a third optional aspect of the present disclosure, when UE 115 detects the NGI mismatch, UE 115 will assume 1 additional bit for the additional set ID i with NGI=1 and sets that to NACK for the acknowledgement feedback message in uplink slot 808. When UE 115 sees a set index used again with the same NGI after a group acknowledgement information is fed back with the same set ID index and NGI, UE 115 would understand the group acknowledgement has been successfully received by base station 105 and can flush this acknowledgement information from memory.

It should be noted that that if UE 115 misses all downlink control signaling for two consecutive sets of transmissions with the same set ID. UE 115 will still transmit inaccurate acknowledgement information. However, in additional aspects of the present disclosure, because base station 105 can control when it reuses the set ID, base station 105 can ensure that it only reuses a set ID after successfully receiving the acknowledgement information of that set ID.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4A and 4B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
  receiving, at a user equipment (UE), a downlink control message from a serving base station, wherein the downlink control message includes an additional set identifier (ID) identifying one or more additional sets of downlink transmissions that map to one or more additional sets of acknowledgement resources;
  obtaining, by the UE, identification of a current set ID identifying a first set of downlink transmissions that map to a current set of acknowledgement resources, wherein the current set ID and the additional set ID identify a same set of downlink transmissions and a same set of acknowledgement resources, wherein the each transmission for which an acknowledgement status is encoded correspond to the same set of downlink transmissions; and
  transmitting, by the UE, an acknowledgement feedback message to the serving base station, an acknowledgement status encoded into the acknowledgement feedback message, and wherein the acknowledgement status is for each transmission identified by the current set ID and the additional set ID.

2. The method of claim 1, further including:
  determining, by the UE, that the current set ID and the additional set ID identify different sets of downlink transmissions and different sets of acknowledgement resources, wherein the each transmission identified by the current set ID and the additional set ID are different transmissions.

3. The method of claim 1, wherein the obtaining includes one of:
  receiving the current set ID in downlink control message;
  deriving the current set ID based on a plurality of transmission acknowledgement parameters; or
  determining the current set ID in accordance with reception of transmission acknowledgement information in the downlink control message.

4. The method of claim 3, wherein a transmission acknowledgement parameter includes one or more of:
  slot index of the acknowledgement transmission time;
  acknowledgement resource indicator;
  a number of transmission set IDs;
  a number of acknowledgement allocated resources.

5. The method of claim 1, wherein the additional set ID includes:
  a bitmap with a length equal to a number of the one or more additional sets of downlink transmissions, wherein each entry in the bitmap identifies the acknowledgement status for zero or more active transmissions of the one or more additional sets of downlink transmissions to include in the acknowledgement feedback message.

6. The method of claim 5, further including:
  identifying a codebook size for a dynamic acknowledgement codebook based on the zero or more active transmissions.

7. The method of claim 5, further including:
  sequentially concatenating, by the UE, the acknowledgement status for each of the zero or more of the one or more additional sets of downlink transmissions according to the bitmap, wherein the sequentially concatenating one of: follows or precedes the acknowledgement status for the first set of downlink transmissions.

8. The method of claim 1, wherein the each transmission are assigned to one of: the current set ID and the additional set ID without regard to contiguity of transmission slot and without regard to location of the current set of acknowledgement resources and the one or more additional sets of acknowledgement resources.

9. The method of claim 1, further including:
  receiving, by the UE, one or more new additional set IDs within subsequent downlink control messages associated with the current set ID, wherein the one or more new additional set IDs identifies additional acknowledgement status information to include in the acknowledgement feedback message.

10. The method of claim 9, wherein the acknowledgement information included in the acknowledgement feedback messaged includes the acknowledgement status one of: associated with a last received downlink control information is used to determine the acknowledgement information, or associated with each of the one or more new additional set IDs.

11. The method of claim 1, wherein one of the one or more additional downlink transmissions identified by the additional set ID includes one or more previous sets of downlink transmissions that map to one or more previous sets of acknowledgement resources and that was identified by a previous additional set ID included in a previous downlink control message.

12. The method of claim 11, wherein the acknowledgement feedback message includes the acknowledgement status for each transmission identified by the current set ID and the additional set ID other than the one or more previous sets of downlink transmissions.

13. The method of claim 11, wherein the acknowledgement feedback message includes the acknowledgement status for each transmission identified by the current set ID and each transmission of the additional set ID including the one or more previous sets of downlink transmissions up to one of:
  a predetermined number of the one or more previous sets of downlink transmissions;
  a first number equal to a number of the one or more previous sets of downlink transmissions until a corresponding previous additional set ID repeats; and
  a second number equal to a total of the one or more previous sets of downlink transmissions until before the corresponding previous additional set ID is set.

14. The method of claim 1, further including:
receiving, by the UE, an indication for a semi-static acknowledgement codebook for generation of the acknowledgement feedback message; and
determining, by the UE, a codebook size of the semi-static acknowledgement codebook to be one of:
two times a current size for acknowledgement of transmissions identified by the current set ID and not the additional set ID; or
an additional size dynamically determined according to the one or more additional sets of downlink transmissions identified by the additional set ID.

15. The method of claim 1, further including:
receiving, by the UE, an indication for a dynamic acknowledgement codebook for generation of the acknowledgement feedback message; and
determining, by the UE, a codebook size of the dynamic acknowledgement codebook according to the one or more additional sets of downlink transmissions identified by the additional set ID.

16. The method of claim 15, further including:
receiving, by the UE, a downlink assignment indices (DAI) in the downlink control message for transmissions associated with the current set ID, wherein the DAI is one of:
incremented independently from a DAI for additional transmissions associated with an additional set ID; or
incremented continuously from the DAI for additional transmissions associated with the additional set ID.

17. The method of claim 15, further including:
identifying, by the UE, a first total number of bits for acknowledging the first set of downlink transmissions identified by the current set ID, wherein the number of the first set of downlink transmissions is identified based on downlink assignment index (DAI) information associated with the current set ID received in the downlink control message; and
receiving, by the UE, a control signal from the serving base station, wherein the control signal identifies a second total number of bits for acknowledging the one or more additional sets of downlink transmissions identified by the additional set ID and associated DAI, wherein a size of the acknowledgement feedback message includes the first total number of bits and the second total number of bits.

18. The method of claim 1,
wherein the current set ID and the additional set ID are members of a repeating group of set IDs, and
wherein the downlink control message further includes a first group ID associated with the current set ID and a second group ID associated with the additional set ID, wherein the first group ID and the second group ID respectively identify an identified group of the repeating group of set IDs associated with each of the current set ID and the additional set ID.

19. The method of claim 18, further including, in response to the second group ID failing to match a last group ID received in a previous downlink control message associated with the additional set ID, one of:
transmitting, by the UE, the acknowledgement feedback message to the serving base station, wherein the acknowledgement status for current transmissions identified by the current set ID is encoded into the acknowledgement feedback message, and wherein a negative acknowledgement associated with the transmissions identified by the additional set ID is encoded into the acknowledgement feedback message; or transmitting, by the UE, the acknowledgement feedback message to the serving base station, wherein the acknowledgement status for the current transmissions identified by the current set ID is encoded into the acknowledgement feedback message, and wherein the additional set ID is ignored.

20. The method of claim 19, wherein the negative acknowledgement associated with the additional set ID occupies a single bit in the acknowledgement feedback message.

21. The method of claim 19, further including:
receiving, at the UE, a subsequent downlink control message including a new set ID and a new group ID, wherein a value of the new set ID and the new group ID are equal to one of: the current set ID and the first group ID or the additional set ID and the second group ID; and
flushing, by the UE, from memory, the acknowledgement status associated with the corresponding one of: the current set ID or the additional set ID.

22. A method of wireless communication, comprising:
transmitting, by a base station, a downlink control message to a user equipment (UE), wherein the downlink control message includes an additional set identifier (ID) identifying one or more additional sets of downlink transmissions that map to one or more additional sets of acknowledgement resources, wherein a current set ID and the additional set ID identify a same set of downlink transmissions and a same set of acknowledgement resources, wherein the each transmission for which an acknowledgement status is encoded correspond to the same set of downlink transmissions; and
receiving, by the base station, an acknowledgement feedback message from the UE, the acknowledgement status encoded into the acknowledgement feedback message, wherein the acknowledgement status is for each transmission identified by the additional set ID and a current set ID identifying a first set of downlink transmissions that map to a current set of acknowledgement resources.

23. The method of claim 22, wherein the current set ID is transmitted by the base station within the downlink control message.

24. The method of claim 22, further including:
assigning, by the base station, transmissions and acknowledgement resources to the current set ID and the additional set ID from a plurality of available downlink transmission slots and a plurality of available acknowledgement resources, wherein the assigning is performed without regard to a location or contiguity of the plurality of available downlink transmission slots or the plurality of available acknowledgement resources.

25. The method of claim 22, further including:
detecting, by the base station, an additional set of acknowledgement information to receive from the UE after beginning of the first set of downlink transmissions, wherein the current set ID remains constant for each transmission slot of the first set of downlink transmissions, and wherein the additional set ID one of:
remains constant for the each transmission slot of the first set of downlink transmissions, or
is updated one or more times to accommodate the additional set of acknowledgement information detected within the first set of downlink transmissions.

26. The method of claim 22, further including:
transmitting, by the base station, an indication to the UE for a dynamic acknowledgement codebook for generation of the acknowledgement feedback message;
incrementing, by the base station, downlink assignment index (DAI) for transmissions associated with the current set ID independently from the DAI for additional transmissions associated with the additional set ID; and
transmitting, by the base station, the DAI in the downlink control message.

27. The method of claim 22, further including:
transmitting, by the base station, an indication to the UE for a dynamic acknowledgement codebook for generation of the acknowledgement feedback message;
incrementing, by the base station, downlink assignment indices (DAI) for transmissions associated with the current set ID continuously from the DAI for additional transmissions associated with the additional set ID; and
transmitting, by the base station, the DAI in the downlink control message.

28. The method of claim 22, further including:
selecting, by the base station, the current set ID and the additional set ID from a repeating group of set IDs, wherein the downlink control message further includes a first group ID associated with the current set ID and a second group ID associated with the additional set ID, wherein the first group ID and the second group ID respectively identify an identified group of the repeating group of set IDs associated with each of the current set ID and the additional set ID.

29. The method of claim 28, further including, in response to the second group ID failing to match a last group ID, one of:
receiving, by the base station, the acknowledgement feedback message from the UE, wherein the acknowledgement status for current transmissions identified by the current set ID is encoded into the acknowledgement feedback message, and wherein a negative acknowledgement associated with the transmissions identified by the additional set ID is encoded into the acknowledgement feedback message; or
receiving, by the base station, the acknowledgement feedback message from the UE, wherein the acknowledgement status for only the current transmissions identified by the current set ID is encoded into the acknowledgement feedback message.

* * * * *